United States Patent
Okawahara et al.

(10) Patent No.: US 6,785,337 B2
(45) Date of Patent: Aug. 31, 2004

(54) MPEG PICTURE PROCESSING APPARATUS AND DATA TRANSFERRING METHOD USING THE APPARATUS

(75) Inventors: Ryohei Okawahara, Tokyo (JP); Akihiko Takabatake, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 707 days.

(21) Appl. No.: 09/737,943

(22) Filed: Dec. 18, 2000

(65) Prior Publication Data

US 2002/0003839 A1 Jan. 10, 2002

(30) Foreign Application Priority Data

Jul. 4, 2000 (JP) ........................................ 2000-202684

(51) Int. Cl.[7] ............................ H04N 7/12; G01R 31/08
(52) U.S. Cl. ................ 375/240.26; 370/232; 348/423.1
(58) Field of Search ...................... 379/240.26, 240.01, 379/240.02, 240.28, 240.25, 229; 718/100; 348/404.1, 419.1, 429.1, 423.1; 370/232; 925/146; 345/530; 369/93

(56) References Cited

U.S. PATENT DOCUMENTS

| | | | | |
|---|---|---|---|---|
| 5,519,684 A | * | 5/1996 | Iizuka et al. ................... | 369/93 |
| 5,909,638 A | * | 6/1999 | Allen .......................... | 725/146 |
| 5,944,778 A | * | 8/1999 | Takeuchi et al. ............ | 718/100 |
| 6,400,819 B1 | * | 6/2002 | Nakano et al. .............. | 379/229 |
| 6,445,679 B1 | * | 9/2002 | Taniguchi et al. .......... | 370/232 |
| 6,661,422 B1 | * | 12/2003 | Valmiki et al. ............. | 345/530 |

FOREIGN PATENT DOCUMENTS

JP            10-108172         4/1998

* cited by examiner

Primary Examiner—Gims Philippe
(74) Attorney, Agent, or Firm—Burns, Doane, Swecker & Mathis, L.L.P.

(57) ABSTRACT

In an MPEG picture processing apparatus, a for-reconstructed-picture data transfer for picture data relating to the decoding performed in a video decoder is performed between the video decoder and an SDRAM, and a second type data transfer for each second type of data is performed between a local buffer and the SDRAM. The for-reconstructed-picture data transfer is preferentially performed at a fixed data transfer quantity in an optimum transfer time-period of the picture data. To preferably perform the for-reconstructed-picture data transfer, a possible data transfer quantity of each second type of data is limited to a minimum value in the optimum transfer time-period of the picture data, and the limitation for the possible data transfer quantity is weak in a non-limited time-period other than the optimum transfer time-period of the picture data. Therefore, the decoding in the video decoder can be efficiently performed even though the number of second types data is increased or the possible data transfer quantity of one second type of data is suddenly changed. Also, each second type data transfer is performed in the non-limited time-period. Therefore, each second type data transfer can be preferably performed.

8 Claims, 8 Drawing Sheets

MPEG PICTURE PROCESSING APPARATUS AND DATA TRANSFERRING METHOD USING THE APPARATUS

BACKGROUND OF THE INVENTION

1. Field of the Invention

The present invention relates to an MPEG picture processing apparatus and a data transferring method using the apparatus in which a decoding operation based on MPEG (Moving Picture Experts Group) is performed and MPEG data is transferred.

2. Description of Related Art

In a picture and audio processing LSI such as an MPEG-2 video and audio decoder, a frame memory, which is used to store a frame of picture data, or a system memory such as an SDRAM (static dynamic random access memory) having an area of an FIFO (first-in first-out) buffer used for an input bit stream is arranged in the inside or outside of the LSI. In this LSI, it is required to perform the transfer of a large quantity of data between a data processing unit and the system memory (or the frame memory). However, the integration in the system LSI has been advanced, the number of functions given to one chip has been increased, and the number of types of data has been increased. Therefore, because a quantity of data and the number of types of data have been increased, it is required to efficiently use a data transfer band. Also, because an inter-frame prediction coding is performed in the picture compression based on the MPEG, picture data used for the prediction is extracted from a frame of picture data, which is stored in a frame memory and precedes or succeeds time-wise to a current frame to be processed, and is used for the decoding operation performed in the video decoder, and decoded data of a reconstructed picture obtained in the video decoder is again written in the frame memory. Therefore, the decoding of picture data closely relates to the data transfer of the picture data from/to the frame memory. In this case, to efficiently operate the video decoder, it is required to transfer the picture data between the video decoder and the frame memory at an optimum timing of the picture data.

FIG. 8 is a block diagram showing the configuration of a conventional picture processing apparatus having a video decoder and a transfer request processing unit. In FIG. 8, 1 indicates a decoding processing unit for decoding picture data. In the decoding processing unit 1, 2 indicates a video decoder, and 3 indicates a video decoding control unit for producing and outputting a plurality of transfer requests, which respectively indicate a request for the data transfer of a type of data, in a pre-set order. 4 indicates a request processing unit for receiving the transfer requests output from the video decoding control unit 3 one after another and outputting a transfer start instruction, which indicates an instruction for the starting of the data transfer of a particular type of data, in response to one transfer request corresponding to the particular type of data for each transfer request. 5 indicates a selector for receiving a plurality of possible data transfer quantities (respectively indicating a possible quantity of a type of data to be transferred), selecting one possible data transfer quantity of the particular type of data, which corresponds to the transfer start instruction, each time the transfer start instruction is output from the request processing unit 4 and outputting the selected possible data transfer quantity as a data transfer quantity (indicating a quantity of data to be transferred) of the particular type of data. 6 indicates a transfer ACK producing unit for producing an acknowledgment signal ACK, which indicates the acknowledgment of the data transfer of the particular type of data, according to the transfer start instruction output from the request processing unit 4 and outputting the acknowledgment signal ACK to the video decoding control unit 3.

Next, an operation of the conventional picture processing apparatus is described.

In an example showing in FIG. 8, the transfer of five types of data dr, dw, a, b and c from the decoding processing unit 1 to an SDRAM (not shown) is performed. Here, the data dr and the data dw denote types of data for a reconstructed picture (called for-reconstructed-picture data), and the data a, the data b and the data c denote types of data other than the for-reconstructed-picture data.

In the video decoding control unit 3, a plurality of transfer requests q-dr, q-dw, q-a, q-b and q-c corresponding to the types of data dr, dw, a, b and c are produced and output to the request processing unit 4 in a pre-set order. For example, the transfer requests q-dr, q-dw, q-a, q-b and q-c are output in that order. Also, a data transfer quantity of the data dr and a data transfer quantity of the data dw are respectively predetermined to a fixed value. In contrast, a possible data transfer quantity of each of the types of data a, b and c is changeable according to an empty capacity of a buffer, to which the corresponding type of data is transferred, and a data filled quantity of a buffer from which the corresponding type of data is transferred. The possible data transfer quantity of the type of data a is indicated by a sign wc-a, the possible data transfer quantity of the type of data b is indicated by a sign wc-b, and the possible data transfer quantity of the type of data c is indicated by a sign wc-c.

Initially, a transfer request q-dr of the data dr produced in the video decoding control unit 3 is output to the request processing unit 4. In the request processing unit 4, the transfer request q-dr is received, and a transfer start instruction of the data dr is actually output. Therefore, the data transfer of the data dr is started. Thereafter, in the transfer ACK producing unit 6, an acknowledgment signal ACK-dr, which indicates the acknowledgment of the transfer of the data dr, is produced according to the transfer start instruction of the data dr and is output to the video decoding control unit 3. In the video decoding control unit 3, a transfer request q-dw of the data dw corresponding to a next data transfer is produced in response to the acknowledgment signal ACK-dr and is output to the request processing unit 4. In the request processing unit 4, when the transfer of the data dr currently performed is completed, a transfer start instruction of the data dw, for which the transfer request q-dw has been already received in the request processing unit 4, is output. Therefore, the data transfer of the data dw is started. Thereafter, in the transfer ACK producing unit 6, an acknowledgment signal ACK-dw is produced according to the transfer start instruction of the data dw and is output to the video decoding control unit 3. In the video decoding control unit 3, a transfer request q-a of the data a corresponding to a next data transfer is produced in response to the acknowledgment signal ACK-dw and is output to the request processing unit 4. In the request processing unit 4, when the transfer of the data dw currently performed is completed, a transfer start instruction of the data a, for which the transfer request q-a has been already received in the request processing unit 4, is output. In this case, in the transfer of the data a, because a possible data transfer quantity of the data a is changeable in dependence on the output timing of the transfer start instruction of the data a, a possible data transfer quantity wc-a determined at the output timing of the transfer start instruction of the data a is selected in the selector 5 according to the transfer start instruction of the data a, and the possible data transfer quantity wc-a is output as a data transfer quantity of the data a. Therefore, the data transfer of the data a is started to transfer the data a of the data transfer quantity. In the same manner, the data transfer of the data b and the data transfer of the data c are started in that order to transfer the data b of a data transfer quantity and the data c of a data transfer quantity. Thereafter, in response to an acknowledgment signal ACK-c output from the transfer ACK producing unit 6, the transfer request q-dr of the type of data dr is again produced in the video decoding control unit 3, and the above processing is repeated.

As is described above, in cases where the number of types of data to be transferred is small, a plurality of transfer requests are produced and output from the video decoding control unit 3 in a pre-set order, and the data transfer of a next type of data is started each time the data transfer of a type of data currently performed is completed. This data transfer control method is available for the types of data of which the number is small.

However, because the types of data are transferred in the pre-set order in the conventional picture processing apparatus having the decoding processing unit 1 and the request processing unit 4, in cases where the number of types of data transferred between the video decoder 2 and an external memory (for example, a frame memory or an SDRAM) is increased, there are following problems.

That is, there is a case where a data transfer band is narrowed. In this case, even though it is not required to immediately perform the transfer of a type of data corresponding to a low possible data transfer quantity, there is a possibility that the transfer of the type of data is immediately transferred according to the pre-set order without immediately transferring another type of data for which an immediate data transfer is desired. Therefore, there is a problem that a data transfer efficiency is lowered in the conventional picture processing apparatus.

Also, in cases where the number of types of data to be transferred is increased, there is a possibility that a timing of the data transfer of the for-reconstructed-picture data dr or dw, in which the data transfer timing is important, is shifted from its optimum transfer timing by receiving an inverse influence of the change of the data transfer quantity of one type of data a, b or c other than the for-reconstructed-picture data. Therefore, there is another problem that it is difficult to maintain an optimum operation of the video decoder 2.

SUMMARY OF THE INVENTION

An object of the present invention is to provide, with due consideration to the problems of the conventional picture processing apparatus, an MPEG picture processing apparatus and a data transferring method using the apparatus in which the decoding operation using a type of for-reconstructed-picture data is efficiently performed, even though the number of types of data is increased or a data transfer quantity of a type of data other than the type of for-reconstructed-picture data is changed, and the transfer of data other than the type of for-reconstructed-picture data is preferably performed if necessary.

The object is achieved by the provision of an MPEG picture processing apparatus of the present invention comprising an MPEG decoding processing unit for decoding picture data; a plurality of data processing units for respectively processing a second type of data; a data storing unit, which is connected with the MPEG decoding processing unit and the data processing units through a data bus, for storing the picture data and the second types of data; and a transfer control unit for controlling a for-reconstructed-picture data transfer between the MPEG decoding processing unit and the data storing unit and a second typed at a transfer between each data processing unit and the data storing unit, wherein the MPEG decoding processing unit comprises a data transfer quantity limiting value producing unit for producing a data transfer quantity limiting value set to a first setting value which is initially determined according to an optimum transfer time-period of the picture data relating to the decoding performed by the MPEG decoding processing unit and is decreased with respect to an operation cycle of the decoding performed by the MPEG decoding processing unit, and the transfer control unit comprises a transfer request processing unit for controlling a data transfer quantity of each second type of data, which is to be transferred in the second type data transfer other than the for-reconstructed-picture data transfer, according to the data transfer quantity limiting value produced in the data transfer quantity limiting value producing unit.

In the above configuration, the data transfer quantity limiting value is decreased to a low value in the optimum transfer time-period of the picture data. Because the second type data transfer other than the for-reconstructed-picture data transfer is performed according to the data transfer quantity limiting value, the performance of the second type data transfer is suppressed in the optimum transfer time-period of the picture data.

Accordingly, the for-reconstructed-picture data transfer between the MPEG decoding processing unit and the data storing unit can be preferably performed, and the decoding operation in the MPEG decoding processing unit can be efficiently performed even though the number of types of data is increased or a data transfer quantity of a type of data other than the type of for-reconstructed-picture data is changed.

Also, the transfer of the second types of data other than the for-reconstructed-picture data can be preferably performed if necessary.

It is preferred that the transfer request processing unit comprises a comparing unit for comparing a pre-set threshold value of transfer start with a possible data transfer quantity of each second type of data, the possible data transfer quantity of the second type of data being determined according to a data filled quantity of a storage area of the corresponding data processing unit or the data storing unit, from which the second type of data is transferred, and a data empty capacity of a storage area of the data storing unit or the corresponding data processing unit to which the second type of data is transferred; and a priority order data transfer control unit for determining a particular second type data transfer, which is first performed among the second type data transfers, according to comparison results obtained in the comparing units and a pre-set priority order.

In the above configuration, in cases where possible data transfer quantities in second type data transfers are respectively higher than the threshold value of transfer start, the possible data transfer quantities of the second types of data are sufficiently large to perform the second type data transfer. Thereafter, a particular second type data transfer having the highest priority among the second type data transfers is preferentially performed.

Accordingly, the transfer of the second types of data other than the for-reconstructed-picture data can be efficiently performed in the priority order.

Also, it is preferred that the data transfer quantity limiting value producing unit comprises a limiting unit for limiting the data transfer quantity limiting value according to a second setting value which is determined according to a macro-block decoding method adopted in the MPEG decoding processing unit, the data transfer quantity limiting value limited in the limiting unit being output to the transfer request processing unit.

In the above configuration, in cases where the macro-block decoding method adopted in the MPEG decoding processing unit is, for example, a forward prediction MB mode or a bi-directional prediction MB mode, each second type data transfer other than the for-reconstructed-picture data transfer is additionally limited according to the second setting value.

Accordingly, even though the macro-block decoding method adopted in the MPEG decoding processing unit is changed, the for-reconstructed-picture data transfer can be performed according to the macro-block decoding method, and the decoding operation in the MPEG decoding processing unit can be efficiently performed.

Also, it is preferred that the transfer request processing unit comprises a comparing unit for comparing a pre-set decoding delay threshold value with a possible data transfer quantity of each second type of data, the possible data transfer quantity of the second type of data being determined according to a data filled quantity of a storage area of the corresponding data processing unit or the data storing unit, from which the second type of data is transferred, and a data empty capacity of a storage area of the data storing unit or the corresponding data processing unit to which the second type of data is transferred; and a decoding start delay requesting unit for requesting a decoding start delay of the MPEG decoding processing unit according to comparison results obtained in the comparing units to delay the starting of a decoding operation for the picture data performed in the MPEG decoding processing unit.

In the above configuration, in cases where at least one possible data transfer quantity of one second type of data is larger than the decoding delay threshold value, the possible data transfer quantity of the second type of data is sufficiently large to transfer the second type of data, and it is desired to immediately transfer the second type of data. In this case, the starting of a decoding operation for the picture data of a next macro-block performed in the MPEG decoding processing unit is delayed, and the second type data transfer of the second type of data is performed during a decoding start delayed time-period.

Accordingly, the transfer of the second type of data other than the for-reconstructed-picture data can be efficiently performed while the decoding operation in the MPEG decoding processing unit is efficiently performed.

The object is also achieved by the provision of an data transferring method of an MPEG picture processing apparatus, which comprises an MPEG decoding processing unit for decoding picture data, a plurality of data processing units for respectively processing a second type of data, and a data storing unit, which is connected with the MPEG decoding processing unit and the data processing units through a data bus, for storing the picture data and the second types of data, comprising the steps of determining a first setting value according to an optimum transfer time-period of the picture data relating to the decoding performed by the MPEG decoding processing unit; decreasing the first setting value with respect to an operation cycle of the decoding performed by the MPEG decoding processing unit; producing a data transfer quantity limiting value set to the first setting value; and controlling a data transfer quantity of each second type of data, which is transferred through the data bus in a second type data transfer other than a for-reconstructed-picture data transfer of the picture data, according to the data transfer quantity limiting value.

In the above steps, the data transfer quantity limiting value is decreased to a low value in the optimum transfer time-period of the picture data. Because the second type data transfer other than the for-reconstructed-picture data transfer is performed according to the data transfer quantity limiting value, the performance of the second type data transfer is suppressed in the optimum transfer time-period of the picture data.

Accordingly, the for-reconstructed-picture data transfer between the MPEG decoding processing unit and the data storing unit can be preferably performed, and the decoding operation in the MPEG decoding processing unit can be efficiently performed even though the number of types of data is increased or a data transfer quantity of a type of data other than the type of for-reconstructed-picture data is changed.

Also, the transfer of the second types of data other than the for-reconstructed-picture data can be preferably performed if necessary.

It is preferred that the data transferring method of an MPEG picture processing apparatus further comprises the steps of determining a possible data transfer quantity of each second type of data according to a data filled quantity of a storage area of the corresponding data processing unit or the data storing unit, from which the second type of data is transferred, and a data empty capacity of a storage area of the data storing unit or the corresponding data processing unit to which the second type of data is transferred; selecting one or more second type data transfers of one or more particular second types of data, of which the possible data transfer quantities are respectively larger than a threshold value of transfer start, from the second type data transfers of the second types of data; selecting the second type data transfer of a specific second type of data relating to a highest priority from the second type data transfers of the particular second types of data: and preferentially performing the second type data transfer of the specific second type of data.

In the above steps, in cases where possible data transfer quantities in second type data transfers are respectively higher than the threshold value of transfer start, the possible data transfer quantities of the second types of data are sufficiently large to perform the second type data transfer. Thereafter, a particular second type data transfer having the highest priority among the second type data transfers is preferentially performed.

Accordingly, the transfer of the second types of data other than the for-reconstructed-picture data can be efficiently performed in the priority order.

Also, it is preferred that the data transferring method of an MPEG picture processing apparatus further comprises the steps of determining a second setting value according to a macro-block decoding method adopted in the MPEG decoding processing unit; and limiting the data transfer quantity limiting value according to the second setting value.

In the above steps, in cases where the macro-block decoding method adopted in the MPEG decoding processing unit is, for example, a forward prediction MB mode or a bi-directional prediction MB mode, each second type data transfer other than the for-reconstructed-picture data transfer is additionally limited according to the second setting value.

Accordingly, even though the macro-block decoding method adopted in the MPEG decoding processing unit is changed, the for-reconstructed-picture data transfer can be performed according to the macro-block decoding method, and the decoding operation in the MPEG decoding processing unit can be efficiently performed.

Also, it is preferred that the data transferring method of an MPEG picture processing apparatus further comprises the step of delaying the starting of the decoding of a next macro-block to be performed in the MPEG decoding processing unit, in cases where one second type data transfer other than the for-reconstructed-picture data transfer remains when the decoding of a current macro-block performed in the MPEG decoding processing unit is completed, until the second type data transfer other than the for-reconstructed-picture data transfer is completed.

In the above step, in cases where at least one possible data transfer quantity of one second type of data is larger than the decoding delay threshold value, the possible data transfer quantity of the second type of data is sufficiently large to transfer the second type of data, and it is desired to immediately transfer the second type of data. In this case, the starting of a decoding operation for the picture data of a next macro-block performed in the MPEG decoding processing unit is delayed, and the second type data transfer of the second type of data is performed during a decoding start delayed time-period.

Accordingly, the transfer of the second type of data other than the for-reconstructed-picture data can be efficiently performed while the decoding operation in the MPEG decoding processing unit is efficiently performed.

DETAILED DESCRIPTION OF THE PREFERRED EMBODIMENTS

Figure 1:
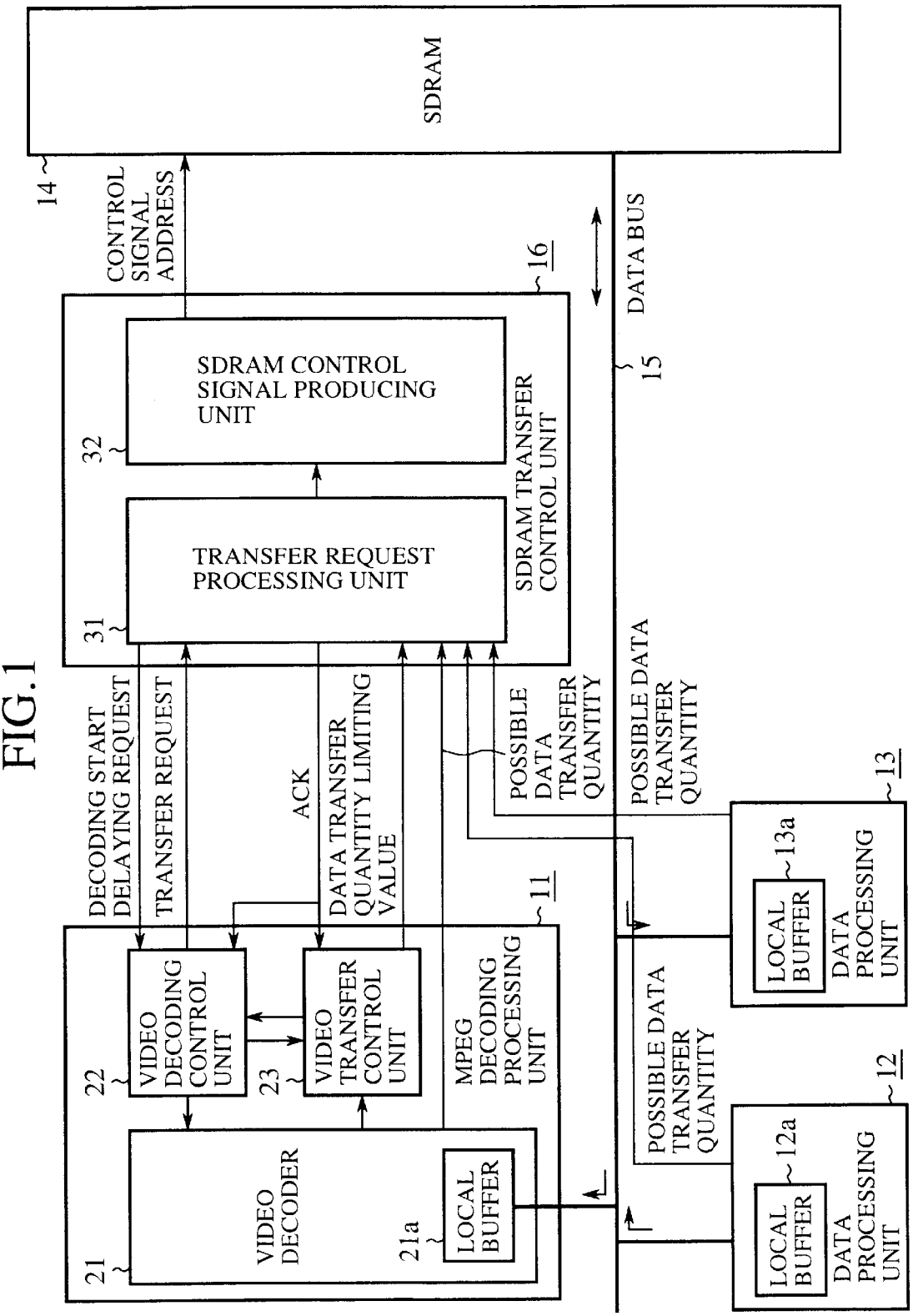
FIG. 1 is a block diagram showing the configuration of an MPEG picture processing apparatus according to a first embodiment of the present invention.

The invention will now be described with reference to the accompanying drawings.

The decoding of MPEG picture data, which is obtained by coding a picture according to an MPEG coding, is performed for each macro-block. Each macro-block is composed of 16 pixels×16 pixels in longitudinal and lateral directions. A decoding method of MPEG picture data is classified into three prediction coding modes such as a non-prediction MB mode (described in a first embodiment), a forward prediction MB mode (described in a second embodiment) and a bi-directional prediction MB mode(described in the second embodiment). The data transfer of for-reconstructed-picture data (composed of reconstructed picture data and predicted picture data), which relates to the decoding operation performed in a video decoder, is called a for-reconstructed-picture data transfer in this specification, and the for-reconstructed-picture data transfer is composed of a predicted picture data transfer and a reconstructed picture data transfer. In the predicted picture data transfer, predicted picture data used for the prediction is extracted from a frame of picture data which is stored in a frame memory of an SDRAM and precedes or succeeds time-wise to a current frame to be decoded, and the predicted picture data is input to the video decoder. In the reconstructed picture data transfer, data of a reconstructed picture obtained by decoding picture data in the video decoder is finally written in the frame memory.

The predicted picture data transfer for a group of luminance components and the predicted picture data transfer for two groups of color difference components are performed for each macro-block decoding, and a data transfer quantity for the group of luminance components and a data transfer quantity for the groups of color difference components are respectively changed in dependence on a type of the prediction coding mode. The reconstructed picture data transfer is performed three times for each macro-block. That is, data corresponding to two blocks (16 pixels×8 pixels) is transferred for each reconstructed picture data transfer, and data of one reconstructed picture corresponding to each macro-block, which is composed of six blocks, is transferred by repeatedly performing the reconstructed picture data transfer three times.

In cases where the decoding of a macro-block is performed in the video decoder by using the inter-frame prediction, there is an operation in which it is required to match the timing of the operation with the timing of the data transfer of a predicted picture transmitted from the SDRAM. Also, the decoding in the video decoder is performed for each macro-block, the decoding of each macro-block is completed by writing data of a reconstructed picture corresponding to the macro-block in the SDRAM, and the decoding of a next macro-block is started. Therefore, the predicted picture data transfer and the reconstructed picture data transfer in the for-reconstructed-picture data transfer relate closely to the operation of the video decoder, and there is an optimum timing of the for-reconstructed-picture data transfer to be performed in the decoding operation. Assuming that the for-reconstructed-picture data transfer from the video decoder (or the SDRAM) to the SDRAM (or the video decoder) is delayed from an optimum timing of the for-reconstructed-picture data transfer, the decoding operation to be performed in the video decoder is delayed, and a processing time required for the decoding of each macro-block is lengthened.

In addition to the for-reconstructed-picture data transfer, another type of data transfer is performed between each of local buffers and the SDRAM. That is, there are a bit stream transfer of video and audio data, an on-screen-display (OSD) data transfer and the transfer of display data including a reconstructed video picture. These data transfers are called a second type data transfer in this specification. In this second type data transfer other than the for-reconstructed-picture data transfer, there is no optimum timing. Therefore, a transfer timing of data in the second type data transfer is not limited, but the operation of each local buffer is controlled so as to prevent the occurrence of a data shortage state and the occurrence of a buffer full state which occurs because of no transfer of data stored in the local buffer.

As is described above, the data transfer performed in the video decoder is classified into the for-reconstructed-picture data transfer and the second type data transfer. In cases where a sum of a transfer quantity of data in the for-reconstructed-picture data transfer and a transfer quantity of data in the second type data transfer is large, to efficiently perform the decoding operation of the video decoder, it is required to start the for-reconstructed-picture data transfer at its optimum transfer time and to perform the second type data transfer in a time-period other than a time-period of the for-reconstructed-picture data transfer.

Embodiment 1

FIG. 1 is a block diagram showing the configuration of an MPEG picture processing apparatus according to a first embodiment of the present invention. In FIG. 1, 11 indicates an MPEG decoding processing unit for decoding picture data dw. 12 and 13 respectively indicate a data processing unit for performing a processing of a second type of data different from the picture data. 14 indicates an SDRAM (or a data storing unit), which is connected with the MPEG decoding processing unit 11 and the data processing units 12 and 13 through a data bus 15, for storing the picture data transferred from the MPEG decoding processing unit 11 as predicted picture data and the second types of data. 16 indicates an SDRAM transfer control unit (or a transfer control unit) for controlling a for-reconstructed-picture data transfer performed between the MPEG decoding processing unit 11 and the SDRAM 14 and a second type data transfer performed between a group of the MPEG decoding processing unit 11 and the data processing units 12 and 13 and the SDRAM 14.

Also, in the MPEG decoding processing unit 11, 21 indicates a video decoder, 21a indicates a local buffer, arranged in the video decoder 21, for holding a second type of data a. 22 indicates a video decoding control unit for controlling the decoding operation performed in the video decoder 21. 23 indicates a video transfer control unit (or a data transfer quantity limiting value producing unit) for producing a data transfer quantity limiting value, which is set to a minimum value at an optimum transfer time of the picture data, to control the second type data transfer other than the for-reconstructed-picture data transfer. The optimum transfer time of the picture data is defined as a specific elapsed time measured after the starting of the decoding operation performed in the video decoder 21 for each macro-block.

Also, in the data processing units 12 and 13, 12a indicates a local buffer, arranged in the data processing unit 12, for holding a second type of data b. 13a indicates a local buffer, arranged in the data processing unit 13, for holding a second type of data c.

In addition, in the SDRAM transfer control unit 16, 31 indicates a transfer request processing unit (or a transfer request processing unit) for instructing the starting of the for-reconstructed-picture data transfer at its optimum time according to a transfer request output from the video decoding control unit 22 to preferentially perform the for-reconstructed-picture data transfer between a frame memory of the SDRAM 14 and the MPEG decoding processing unit 11, producing a data transfer quantity of each second type of data other than the picture data according to the data transfer quantity limiting value produced in the video transfer control unit 23 and instructing the starting of each second type data transfer according to a transfer request output from the video decoding control unit 22 to perform the second type data transfer between the SDRAM 14 and each of the local buffers 21a, 12a and 13a at the data transfer quantity. 32 indicates an SDRAM control signal producing unit for producing a control signal and an address and outputting the control signal and the address to the SDRAM 14 to control the SDRAM 14 to perform the reconstructed picture data transfer of the picture data from the MPEG decoding processing unit 11 to the SDRAM 14, the predicted picture data transfer of the predicted picture data from the SDRAM 14 to the MPEG decoding processing unit 11 or the second type data transfer of the second type of data between the SDRAM 14 and each of the MPEG decoding processing unit 11, the data processing units 12 and 13.

Figure 2:
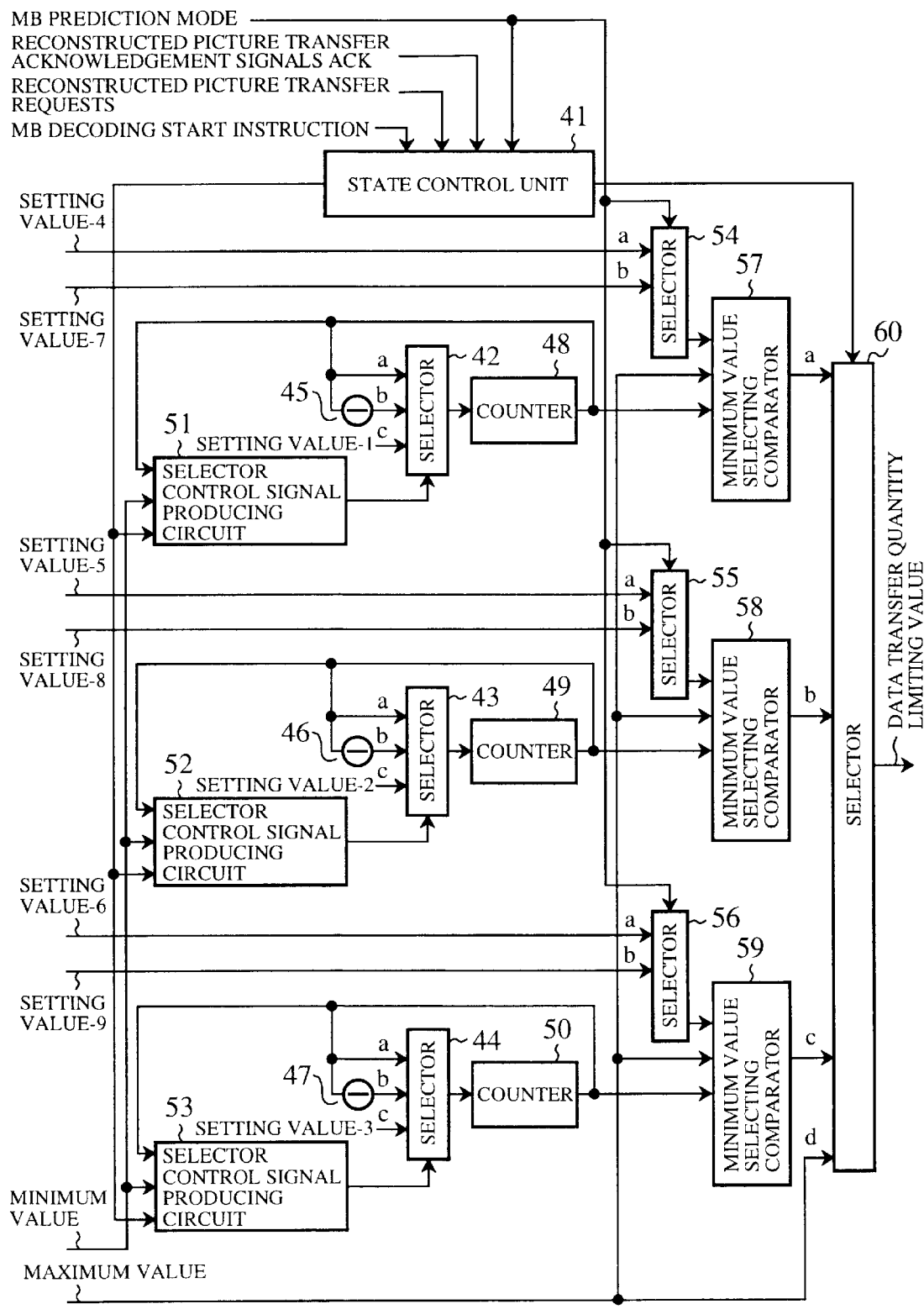
FIG. 2 is a block diagram showing a detailed configuration of a video transfer control unit shown in FIG. 1.

FIG. 2 is a block diagram showing a detailed configuration of the video transfer control unit 23. In FIG. 2, 41 indicates a state control unit for receiving an MB prediction mode, an MB (macro-block) decoding start instruction and three reconstructed picture transfer requests (called a first reconstructed picture transfer request, a second reconstructed picture transfer request and a third reconstructed picture transfer request received in that order) output from the video decoding control unit 22 for each macro-block, receiving three reconstructed picture transfer acknowledgment signals ACK output from the transfer request processing unit 31 in response to the reconstructed picture transfer requests for each macro-block and producing an MB1 state corresponding to a first data transfer of two blocks, an MB2 state corresponding to a second data transfer of two blocks, an MB3 state corresponding to a third data transfer of two blocks and an idle state corresponding to no data transfer one after another in that order according to the MB decoding start instruction and the reconstructed picture transfer acknowledgment signals ACK for each macro-block. 51 indicates a selector control signal producing circuit for producing a selector control signal according to the MB decoding start instruction received in the state control unit 41, producing another selector control signal according to the first reconstructed picture transfer request received in the state control unit 41 and outputting the selector control signals. 52 indicates a selector control signal producing circuit for producing a selector control signal according to the first reconstructed picture transfer request received in the state control unit 41, producing another selector control signal according to the second reconstructed picture transfer request received in the state control unit 41 and outputting the selector control signals. 53 indicates a selector control signal producing circuit for producing a selector control signal according to the second reconstructed picture transfer request received in the state control unit 41, producing another selector control signal according to the third reconstructed picture transfer request received in the state control unit 41 and outputting the selector control signals. 42 to 44 respectively indicate a selector for selecting one of an input a, an input b and an input c according to the selector control signals output from the corresponding selector control signal producing circuit 51, 52 or 53. 48 to 50 respectively indicate a counter, which is formed of a flip-flop circuit, for outputting a value of the input selected in the corresponding selector 42, 43 or 44 as a counted value. 45 to 47 respectively indicate a subtracting unit for decrementing the counted value output from the corresponding counter 48, 49 or 50. 57 to 59 respectively indicate a minimum value selecting comparator for selecting the counted value output from the corresponding counter 48, 49 or 50 in cases where the counted value is equal to or lower than a maximum value and selecting the maximum value in cases where the counted value is more than the maximum value. 60 indicates a selector for selecting one of an input a output from the minimum value selecting comparator 57, an input b output from the minimum value selecting comparator 58, an input c output from the minimum value selecting comparator 59 and an input d denoting the maximum value according to the four states produced in the state control unit 41 and outputting the selected input to the transfer request processing unit 31 as a data transfer quantity limiting value applied for the second type data transfer.

Figure 3:
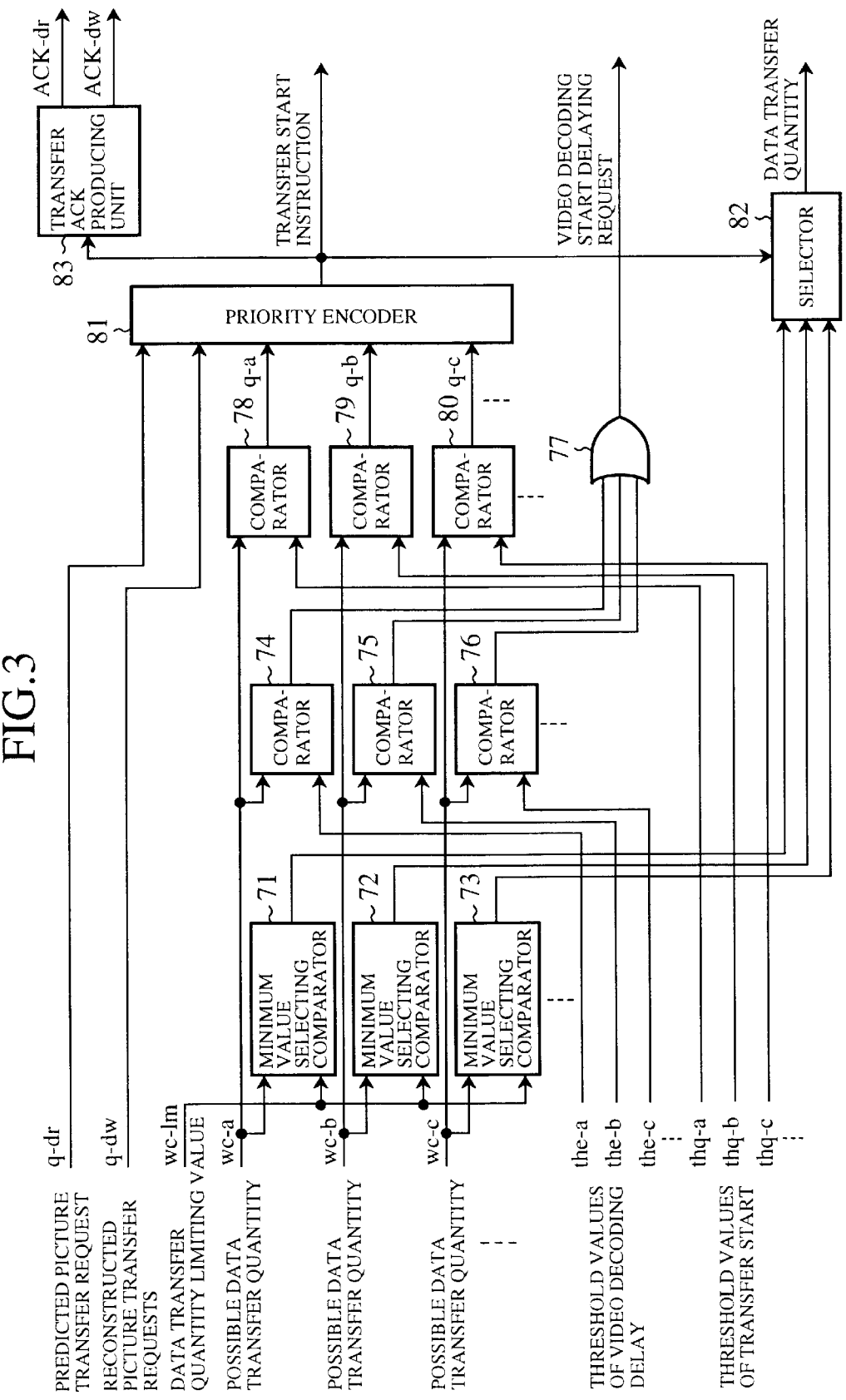
FIG. 3 is a block diagram showing a detailed configuration of a transfer request processing unit shown in FIG. 1.

FIG. 3 is a block diagram showing a detailed configuration of the transfer request processing unit 31. In FIG. 3, 71 indicates a minimum value selecting comparator for comparing a possible data transfer quantity wc-a of the second type of data a and the data transfer quantity limiting value wc-lm produced in the video transfer control unit 23 and selecting a lower quantity or value from the quantity wc-a and the limiting value wc-lm. 72 indicates a minimum value selecting comparator for comparing a possible data transfer quantity wc-b of the second type of data b and the data transfer quantity limiting value wc-lm and selecting a lower quantity or value from the quantity wc-b and the limiting value wc-lm. 73 indicates a minimum value selecting comparator for comparing a possible data transfer quantity wc-c of the second type of data c and the data transfer quantity limiting value wc-lm and selecting a lower quantity or value from the quantity wc-c and the limiting value wc-lm. 78 indicates a comparator for comparing the possible data transfer quantity wc-a and a threshold value thq-a of transfer start and outputting a data transfer request q-a in cases where the possible data transfer quantity wc-a is higher than the threshold value thq-a of transfer start. 79 indicates a comparator for comparing the possible data transfer quantity wc-b and a threshold value thq-b of transfer start and outputting a data transfer request q-b in cases where the possible data transfer quantity wc-b is higher than the threshold value thq-b of transfer start. 80 indicates a comparator for comparing the possible data transfer quantity wc-c and a threshold value thq-c of transfer start and outputting a data transfer request q-c in cases where the possible data transfer quantity wc-c is higher than the threshold value thq-c of transfer start. The threshold values thq-a to thq-c of transfer start are changeably set. 81 indicates a priority encoder (or a priority order data transfer control unit) for selecting one transfer request from the reconstructed picture transfer request q-dw of the picture data dw and the data transfer requests q-a, q-b and q-c of the second types of data a, b and c according to a pre-set priority order, producing a transfer start instruction of a type of data corresponding to the selected transfer request and outputting the transfer start instruction to start the data transfer of the type of data corresponding to the selected transfer request. 82 indicates a selector for selecting one output from the outputs of the minimum value selecting comparators 71 to 73 according to the transfer start instruction output from the priority encoder 81 and outputting the selected output as a data transfer quantity of one second type of data which corresponds to the transfer start instruction and differs from the picture data dw. 83 indicates a transfer ACK producing unit for producing the reconstructed picture transfer acknowledgment signal ACK-dw of the picture data dw corresponding to the transfer start instruction output from the priority encoder 81 and outputting the reconstructed picture transfer acknowledgment signal ACK-dw to the video transfer control unit 23.

Next, an operation performed in the MPEG picture processing apparatus is described.

In FIG. 1, in the video decoding control unit 22 of the MPEG decoding processing unit 11, an MB decoding start instruction, three reconstructed picture transfer requests and an MB prediction mode are produced and output to the video transfer control unit 23 for each macro-block while controlling the video decoder 21. Also, the three reconstructed picture transfer requests are output one after another from the video decoding control unit 22 to the transfer request processing unit 31 for each macro-block.

In the video transfer control unit 23, three reconstructed picture transfer acknowledgment signals ACK output from the transfer request processing unit 31 in response to the reconstructed picture transfer requests are also received, and a data transfer quantity limiting value applied for the second type data transfers is produced according to the MB decoding start instruction, the reconstructed picture transfer requests, the MB prediction mode and the reconstructed picture transfer acknowledgment signals ACK for each macro-block. The data transfer quantity limiting value is output to the transfer request processing unit 31.

In the transfer request processing unit 31, a transfer start instruction, which indicates a specific data transfer to be started, is produced according to the reconstructed picture transfer requests output from the video decoding control unit 22 and a plurality of possible data transfer quantities output from the local buffers 21a, 12a and 13a of the MPEG decoding processing unit 11 and the data processing units 12 and 13. In cases where the transfer start instruction indicates the for-reconstructed-picture data transfer, the transfer of the picture data dw is started according to the transfer start instruction. After the for-reconstructed-picture data transfer is started, the reconstructed picture transfer acknowledgment signal ACK is output from the transfer request processing unit 31 to the video decoding control unit 22 and the video transfer control unit 23. Also, in cases where the transfer start instruction indicates the starting of a second type data transfer other than the for-reconstructed-picture data transfer, a data transfer quantity, which indicates the number of words (or a data quantity) to be transferred in the second type data transfer, is produced according to the data transfer quantity limiting value output from the video transfer control unit 23 and the possible data transfer quantities. The transfer start instruction and the data transfer quantity are output to the SDRAM control signal producing unit 32. Therefore, the for-reconstructed-picture data transfer is performed in response to the transfer start instruction, and the second type data transfer other than the for-reconstructed-picture data transfer is performed in response to the transfer start instruction to transfer the second type of data at its data transfer quantity.

In the SDRAM control signal producing unit 32, a control signal and an address are produced according to the transfer start instruction and the data transfer quantity output from the transfer request processing unit 31 and are output to the SDRAM 14.

An operation performed in the video transfer control unit 23 in case of the macro-block decoding based on the non-prediction MB mode is described with reference to FIG. 2 and FIG. 4.

Figure 4:
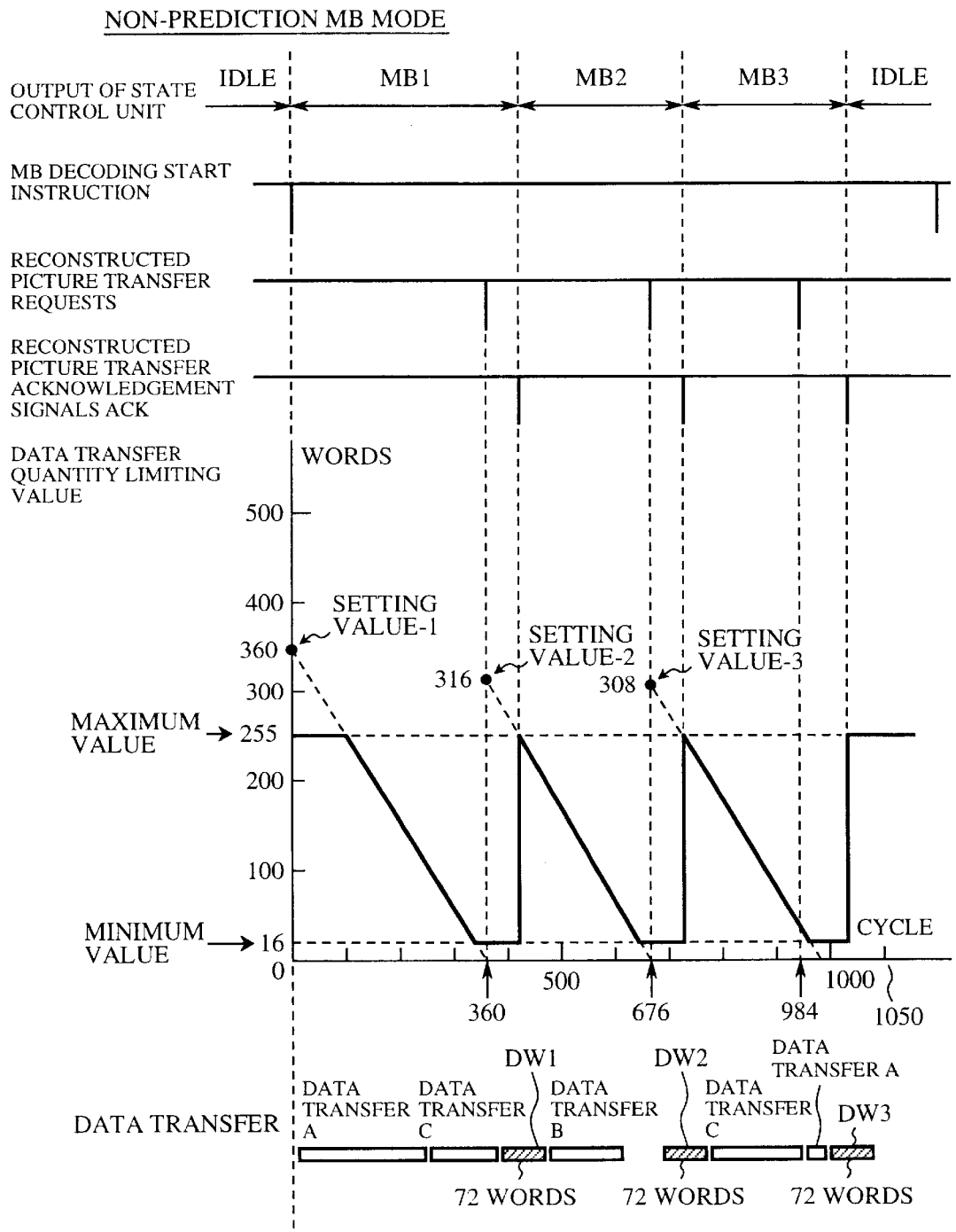
FIG. 4 is a timing chart showing a decoding operation for a macro-block (MB) performed in a non-prediction MB mode according to the first embodiment of the present invention.

FIG. 4 is a timing chart showing a decoding operation for a macro-block (MB) performed in a non-prediction MB mode according to the first embodiment of the present invention.

As shown in FIG. 4, as an example, a decoding time-period required in the video decoder 21 for each macro-block is equal to 1100 cycles, an optimum timing of the for-reconstructed-picture data transfer first performed is the 360-th cycle which is determined by counting the number of cycles from the starting of the macro-block decoding, an optimum timing of the for-reconstructed-picture data transfer secondly performed is the 676-th cycle, and an optimum timing of the for-reconstructed-picture data transfer thirdly performed is the 984-th cycle. Also, a setting value-1 (or a first setting value) is set to 360 (words) which is equivalent to the number of cycles in a time-period from the reception of the MB decoding start instruction to the inputting of the first reconstructed picture transfer request, a setting value-2 (or a first setting value) is set to 316 (words) which is equivalent to the number of cycles (676–360) in a time-period from the inputting of the first reconstructed picture transfer request to the inputting of the second reconstructed picture transfer request, and a setting value-3 (or a first setting value) is set to 308 (words) which is equivalent to the number of cycles (984–676) in a time-period from the inputting of the second reconstructed picture transfer request to the inputting of the third reconstructed picture transfer request.

Here, setting values from a setting value-4 to a setting value-9 and selectors 54 to 56 are described in a second embodiment.

In FIG. 2, in the state control unit 41, an MB1 state, an MB2 state, an MB3 state and an idle state shown in FIG. 4 are produced one after another in that order according to the MB decoding start instruction output from the video decoding control unit 22 and the three reconstructed picture transfer acknowledgment signals ACK output from the transfer request processing unit 31. That is, the MB1 state is produced in response to the reception of the MB decoding start instruction to set the MPEG picture processing apparatus to the MB1 state, the MB2 state is produced in response to the first reception of the reconstructed picture transfer acknowledgment signal ACK to set the MPEG picture processing apparatus to the MB2 state, the MB3 state is produced in response to the second reception of the reconstructed picture transfer acknowledgment signal ACK to set the MPEG picture processing apparatus to the MB3 state, and the idle state is produced in response to the third reception of the reconstructed picture transfer acknowledgment signal ACK to set the MPEG picture processing apparatus to the idle state.

When the MB decoding start instruction output from the video decoding control unit 22 is received in the state control unit 41, the MB decoding start instruction is output to the selector control signal producing circuit 51, a selector control signal is produced in the selector control signal producing circuit 51 according to the MB decoding start instruction, the selector control signal is input to the selector 42 to make the selector 42 select an input c indicating the setting value-1 of 360, and the setting value-1 is loaded into the counter 48. Thereafter, the selector control signal producing circuit 51 controls the selector 42 to make the selector 42 select an input b for each cycle until the first reconstructed picture transfer request received in the state control unit 41 at the 360-th cycle is input to the selector control signal producing circuit 51. Therefore, the setting value-1 of the selector 42 is decremented for each cycle according to a loop operation performed in the counter 48, the subtracting unit 45 and the selector 42. Thereafter, when a decremented counted value output from the counter 48 agrees with a minimum value pre-set to 16 words, the selector control signal producing circuit 51 controls the selector 42 to make the selector 42 select an input a indicating the counted value of the counter 48. Therefore, the counted value of the counter 48 is maintained to the minimum value of 16 words. Here, a first performance DW1 of the for-reconstructed-picture data transfer is started in response to the first reconstructed picture transfer request during a time-period in which the counted value of the counter 48 is maintained to the minimum value.

Also, when the first reconstructed picture transfer request output from the video decoding control unit 22 is received in the state control unit 41 at the 360-th cycle, the first reconstructed picture transfer request is output to the selector control signal producing circuit 52, a selector control signal is produced in the selector control signal producing circuit 52 according to the first reconstructed picture transfer request, the selector control signal is input to the selector 43 to make the selector 43 select an input c indicating the setting value-2 of 316, and the setting value-2 is loaded into the counter 49. Thereafter, the selector control signal producing circuit 52 controls the selector 43 to make the selector 43 select an input b for each cycle until the second reconstructed picture transfer request received in the state control unit 41 at the 676-th cycle is input to the selector control signal producing circuit 52. Therefore, the setting value-2 of the selector 43 is decremented for each cycle according to a loop operation performed in the counter 49, the subtracting unit 46 and the selector 43. Thereafter, when a decremented counted value output from the counter 49 agrees with the minimum value pre-set to 16 words, the selector control signal producing circuit 52 controls the selector 43 to make the selector 43 select an input a indicating the counted value of the counter 49. Therefore, the counted value of the counter 49 is maintained to the minimum value of 16 words. Here, a second performance DW2 of the for-reconstructed-picture data transfer is started in response to the second reconstructed picture transfer request in a time-period in which the counted value of the counter 49 is maintained to the minimum value.

Also, when the second reconstructed picture transfer request output from the video decoding control unit 22 is received in the state control unit 41 at the 676-th cycle, the second reconstructed picture transfer request is output to the selector control signal producing circuit 53, a selector control signal is produced in the selector control signal producing circuit 53 according to the second reconstructed picture transfer request, the selector control signal is input to the selector 44 to make the selector 44 select an input c indicating the setting value-3 of 308, and the setting value-3 is loaded into the counter 50. Thereafter, the selector control signal producing circuit 53 controls the selector 44 to make the selector 44 select an input b for each cycle until the third reconstructed picture transfer request received in the state control unit 41 at the 984-th cycle is input to the selector control signal producing circuit 53. Therefore, the setting value-3 of the selector 44 is decremented for each cycle according to a loop operation performed in the counter 50, the subtracting unit 47 and the selector 44. Thereafter, when a decremented counted value output from the counter 50 agrees with the minimum value pre-set to 16 words, the selector control signal producing circuit 53 controls the selector 44 to make the selector 44 select an input a indicating the counted value of the counter 50. Therefore, the counted value of the counter 50 is maintained to the minimum value of 16 words. Here, a third performance DW3 of the for-reconstructed-picture data transfer is started in response to the third reconstructed picture transfer request in a time-period in which the counted value of the counter 50 is maintained to the minimum value.

In each of the minimum value selecting comparators 57 to 59, the counted value of the corresponding counter 48, 49 or 50 is compared with a maximum value pre-set to 255 words. In cases where the counted value is more than the maximum value, the maximum value is selected and is output to the selector 60. In contrast, in cases where the counted value is equal to or less than the maximum value, the counted value is selected and is output to the selector 60.

In the selector 60, one input is selected from an input a output from the minimum value selecting comparator 57, an input b output from the minimum value selecting comparator 58, an input c output from the minimum value selecting comparator 59 and an input d denoting the maximum value of 255 words according to the prediction coding mode (the MB1 state, the MB2 state, the MB3 state or the idle state) produced in the state control unit 41, and the selected input is output to the transfer request processing unit 31 as the data transfer quantity limiting value applied for the second type data transfers. That is, as shown in FIG. 4, the input a is selected in case of the MB1 state, the input b is selected in case of the MB2 state, the input c is selected in case of the MB3 state, the input d is selected in case of the idle state, and the input selected in the selector 60 is output as the data transfer quantity limiting value.

As is described above, in the video transfer control unit 23 shown in FIG. 2, the data transfer quantity limiting value for the second type data transfers other than the for-reconstructed-picture data transfer can be output according to the MB decoding start instruction, the reconstructed picture transfer requests and the reconstructed picture transfer acknowledgment signals ACK for each-macro-block to limit data transfer quantities of the second types of data.

That is, a data quantity in the second type data transfer is limited to a value equal to or lower than the data transfer quantity limiting value, and the data transfer quantity limiting value is set to be reduced to the minimum value of 16 words at each optimum time (or each optimum start time) of the for-reconstructed-picture data transfer.

Next, an operation performed in the transfer request processing unit 31 in case of the macro-block decoding based on the non-prediction MB mode is described with reference to FIG. 3 and FIG. 4.

As shown in FIG. 3, in each of the minimum value selecting comparators 71 to 73, a possible data transfer quantity wc-a, wc-b or wc-c is compared with the data transfer quantity limiting value wc-lm produced in the video transfer control unit 23, and a lower value is selected from the value and the quantity. The lower values selected in the minimum value selecting comparators 71 to 73 are output to the selector 82 as data transfer quantities of three second types of data in the second type data transfer other than the for-reconstructed-picture data transfer. Here, each of the possible data transfer quantities wc-a, wc-b and wc-c indicates a possible quantity of data to be transferred in the second type data transfer other than the for-reconstructed-picture data transfer. Each of the possible data transfer quantities wc-a, wc-b and wc-c is determined according to a filled quantity of data in a local buffer, from which the data is transferred, and an empty capacity of a local buffer to which data is transferred. For example, each of the possible data transfer quantities wc-a, wc-b and wc-c indicate a possible quantity of data to be transferred between one of the local buffers 12a, 13a and 21a and the SDRAM 14 in the second type data transfer other than the for-reconstructed-picture data transfer.

Here, threshold values the-a, the-b and the-c of the video decoding start delay, comparators 74 to 76 and a logical circuit 77 are described in a third embodiment.

In the comparator 78, the possible data transfer quantity wc-a is compared with a transfer start threshold value thq-a changeably set. In cases where the possible data transfer quantity wc-a is more than the threshold value thq-a of transfer start, because the possible data transfer quantity wc-a of the second type of data a is sufficiently large to perform the second type data transfer, a data transfer request q-a is output to the priority encoder 81 to set the second type of data a having the possible data transfer quantity wc-a as a candidate for the second type data transfer. In the comparator 79, the possible data transfer quantity wc-b is compared with a transfer start threshold value thq-b changeably set. In cases where the possible data transfer quantity wc-b is more than the threshold value thq-b of transfer start, because the possible data transfer quantity wc-b of the second type of data b is sufficiently large to perform the second type data transfer, a data transfer request q-b is output to the priority encoder 81 to set the second type of data b having the possible data transfer quantity wc-b as a candidate for the second type data transfer. In the comparator 80, the possible data transfer quantity wc-c is compared with a transfer start threshold value thq-c changeably set. In cases where the possible data transfer quantity wc-c is more than the threshold value thq-c of transfer start, because the possible data transfer quantity wc-c of the second type of data c is sufficiently large to perform the second type data transfer, a data transfer request q-c is output to the priority encoder 81 to set the second type of data c having the possible data transfer quantity wc-c as a candidate for the second type data transfer.

The reason that the comparison is applied for the possible data transfer quantities wc-a to wc-c of the second types of data in the comparators 78 to 80 is as follows. That is, a data transfer quantity of each second type of data corresponding to the second type data transfer other than the for-reconstructed-picture data transfer is not fixed, and there is a possibility that the data transfer quantity of the second type of data is limited according to the data transfer quantity limiting value wc-lm. Therefore, it is checked in each of the comparators 78 to 80 whether or not the possible data transfer quantity of the type of data is sufficiently large. In contrast, because a data transfer quantity of the picture data dw corresponding to the for-reconstructed-picture data transfer is fixed, each reconstructed picture transfer request q-dw corresponding to the for-reconstructed-picture data transfer is directly input to the priority encoder 81.

In the priority encoder 81, one transfer request is selected from the reconstructed picture transfer request q-dw and the data transfer requests q-a, q-b and q-c according to a pre-set priority order, and a transfer start instruction, which indicates the starting of the data transfer (the for-reconstructed-picture data transfer or the second type data transfer) for a type of data corresponding to the selected transfer request, is output. Therefore, in cases where a current time is within an optimum time-period of the for-reconstructed-picture data transfer, the for-reconstructed-picture data transfer is preferentially selected in response to the reconstructed picture transfer request q-dw, and the for-reconstructed-picture data transfer (refer to the data transfer DW1, DW2 or DW3 shown in FIG. 4) is performed between the local buffer 21a and the SDRAM 14 in the macro-block decoding based on the non-prediction MB mode. In this optimum time-period of the for-reconstructed-picture data transfer, the data transfer limiting value wc-lm for the second type data transfers is set to the minimum value in the video transfer control unit 23. In contrast, in cases where a current time is not within the optimum time-period of the for-reconstructed-picture data transfer, the second type data transfer (the data transfer A, the data transfer B or the data transfer C shown in FIG. 4) corresponding to a specific data transfer request, which has the highest priority among those of the data transfer requests q-a, q-b and q-c, is selected. In general, the specific data transfer request corresponds to a specific possible data transfer quantity which has the largest value among those of the possible data transfer quantities wc-a, wc-b and wc-c.

Thereafter, in cases where the transfer start instruction output from the priority encoder 81 corresponds to the second type data transfer indicated by the selected data transfer request q-a, q-b or q-c, a data transfer quantity corresponding to a specific possible data transfer quantity wc-a, wc-b or wc-c, which corresponds to the selected data transfer request q-a, q-b or q-c, is selected in the selector 82 from the three data transfer quantities which are limited by the data transfer quantity limiting value wc-lm in the minimum value selecting comparators 71 to 73, and the selected data transfer quantity is output to the SDRAM control signal producing unit 32. Therefore, the second type data transfer for a second type of data corresponding to the specific possible data transfer quantity is performed at the selected data transfer quantity between one of the local buffers 21a, 12a and 13a and the SDRAM 14 under the control of the SDRAM control signal producing unit 32.

Also, in cases where the transfer start instruction output from the priority encoder 81 corresponds to the for-reconstructed-picture data transfer indicated by the selected reconstructed picture transfer request q-dw, the for-reconstructed-picture data transfer for the picture data dw corresponding to the reconstructed picture transfer request q-dw is performed at a predetermined data transfer quantity between the video decoder 21 and the SDRAM 14 under the control of the SDRAM control signal producing unit 32. Thereafter, in the transfer ACK producing unit 83, a reconstructed picture transfer acknowledgment signal ACK-dw, which indicates the acknowledgment of the for-reconstructed-picture data transfer for the picture data dw corresponding to the reconstructed picture transfer request q-dw, is produced and is output to the video decoding control unit 22 and the video transfer control unit 23.

Therefore, in the transfer request processing unit 31 shown in FIG. 3, the for-reconstructed-picture data transfer (DW1, DW2 or DW3 shown in FIG. 4) can be preferentially performed between the local buffer 21a of the video decoder 21 and the SDRAM 14 in the macro-block decoding based on the non-prediction MB mode. Also, the second type data transfer (the data transfer A, B or C shown in FIG. 4) other than the for-reconstructed-picture data transfer can be performed while limiting the data transfer quantity within the data transfer quantity limiting value wc-lm (shown as a polygonal line in FIG. 4).

Accordingly, in the first embodiment, because the for-reconstructed-picture data transfer of the picture data is preferentially selected, the for-reconstructed-picture data transfer of the picture data can be reliably performed at each optimum time-period of the for-reconstructed-picture data transfer. Therefore, even though the number of types of data is increased or a data transfer quantity of a second type of data other than the picture data is changed, the decoding processing of the video decoder 21 using the picture data can be efficiently performed.

Also, because the data transfer quantity in the second type data transfer other than the for-reconstructed-picture data transfer is limited to the minimum value in each optimum time-period of the for-reconstructed-picture data transfer, the for-reconstructed-picture data transfer of the picture data can be preferably performed between the MPEG decoding processing unit 11 and the SDRAM 14 in each optimum time-period of the for-reconstructed-picture data transfer. Therefore, the decoding processing of the video decoder 21 using the picture data can be efficiently performed.

Also, because each second type of data other than the picture data is selected according to the pre-set priority from a plurality of second types of data of which the possible data transfer quantities are respectively higher than the corresponding threshold value of transfer start, the data transfer of the selected second type of data can be preferably performed, and the second type data transfers other than the for-reconstructed-picture data transfer can be efficiently performed.

Also, because the data transfer quantity limiting value wc-lm is set to a value higher than the minimum value in a time-period other than the optimum time-periods of the for-reconstructed-picture data transfer, the second type data transfers other than the for-reconstructed-picture data transfer can be efficiently performed.

Embodiment 2

In cases where the data transfer of the for-reconstructed-picture data is performed in a forward prediction MB mode or a bi-directional prediction MB mode adopted as a macro-block decoding method, the predicted picture data transfer from the frame memory of the SDRAM 14 to the video decoder 21 is required, and a data transfer quantity of predicted picture data in the predicted picture data transfer depends on the prediction coding mode (the forward prediction MB mode and the bi-directional prediction MB mode). In this case, the for-reconstructed-picture data transfer composed of the predicted picture data transfer and the reconstructed picture data transfer occupies a great part of data transfer performed in the MPEG picture processing apparatus, and a ratio of the for-reconstructed-picture data transfer to the whole data transfer is changeable in dependence of the prediction coding mode. Therefore, the second type data transfer other than the for-reconstructed-picture data transfer is performed in a short time-period placed between optimum transfer time-periods of the for-reconstructed-picture data transfers. To efficiently perform the decoding operation of the video decoder 21, the data transfer quantity limiting value wc-lm is moreover limited in this embodiment by using other setting values.

In FIG. 2, 54 indicates a selector (or a limiting unit) for selecting a setting value-4 (or a second setting value) in cases where a prediction MB mode output from the video decoding control unit 22 is set to a forward prediction MB mode, selecting a setting value-7 (or a second setting value) in cases where the prediction MB mode is set to a bi-directional prediction MB mode, and outputting the selected value to the minimum value selecting comparator 57. 55 indicates a selector (or a limiting unit) for selecting a setting value-5 (or a second setting value) in cases where the prediction MB mode is set to the forward prediction MB mode, selecting a setting value-8 (or a second setting value) in cases where the prediction MB mode is set to the bi-directional prediction MB mode, and outputting the selected value to the minimum value selecting comparator 58. 56 indicates a selector (or a limiting unit) for selecting a setting value-6 (or a second setting value) in cases where the prediction MB mode is set to the forward prediction MB mode, selecting a setting value-9 (or a second setting value) in cases where the prediction MB mode is set to the bi-directional prediction MB mode, and outputting the selected value to the minimum value selecting comparator 59.

Also, in FIG. 3, a predicted picture transfer request q-dr is input to the priority encoder 81, and a predicted picture transfer acknowledgment signal ACK-dr is produced in the transfer ACK producing unit 83 according to the transfer start instruction output from the priority encoder 81 in cases where the transfer start instruction indicates the starting of the predicted picture data transfer.

Figure 5:
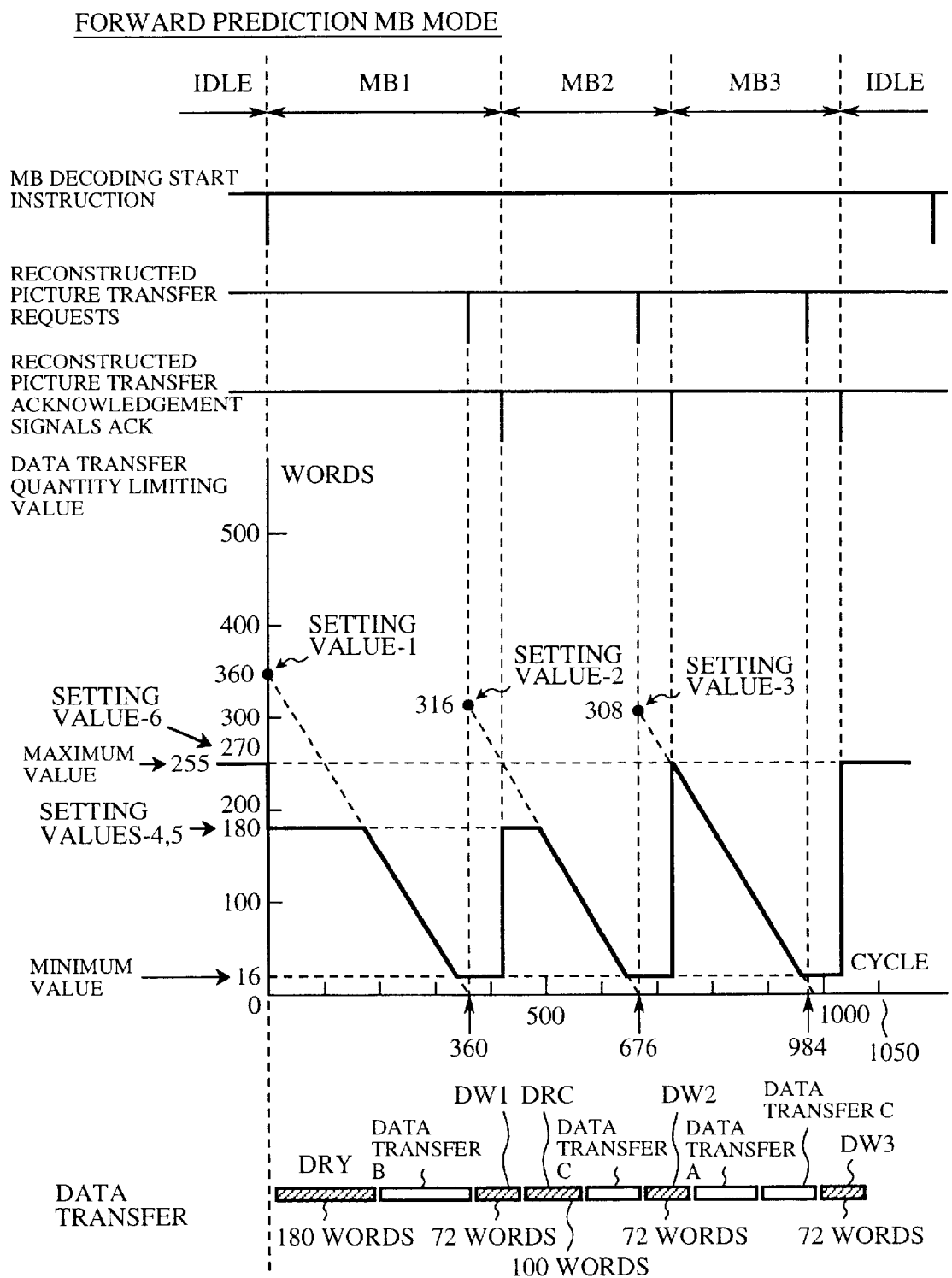
FIG. 5 is a timing chart showing a decoding operation for a macro-block (MB) performed in a forward prediction MB mode according to a second embodiment of the present invention.
Figure 6:
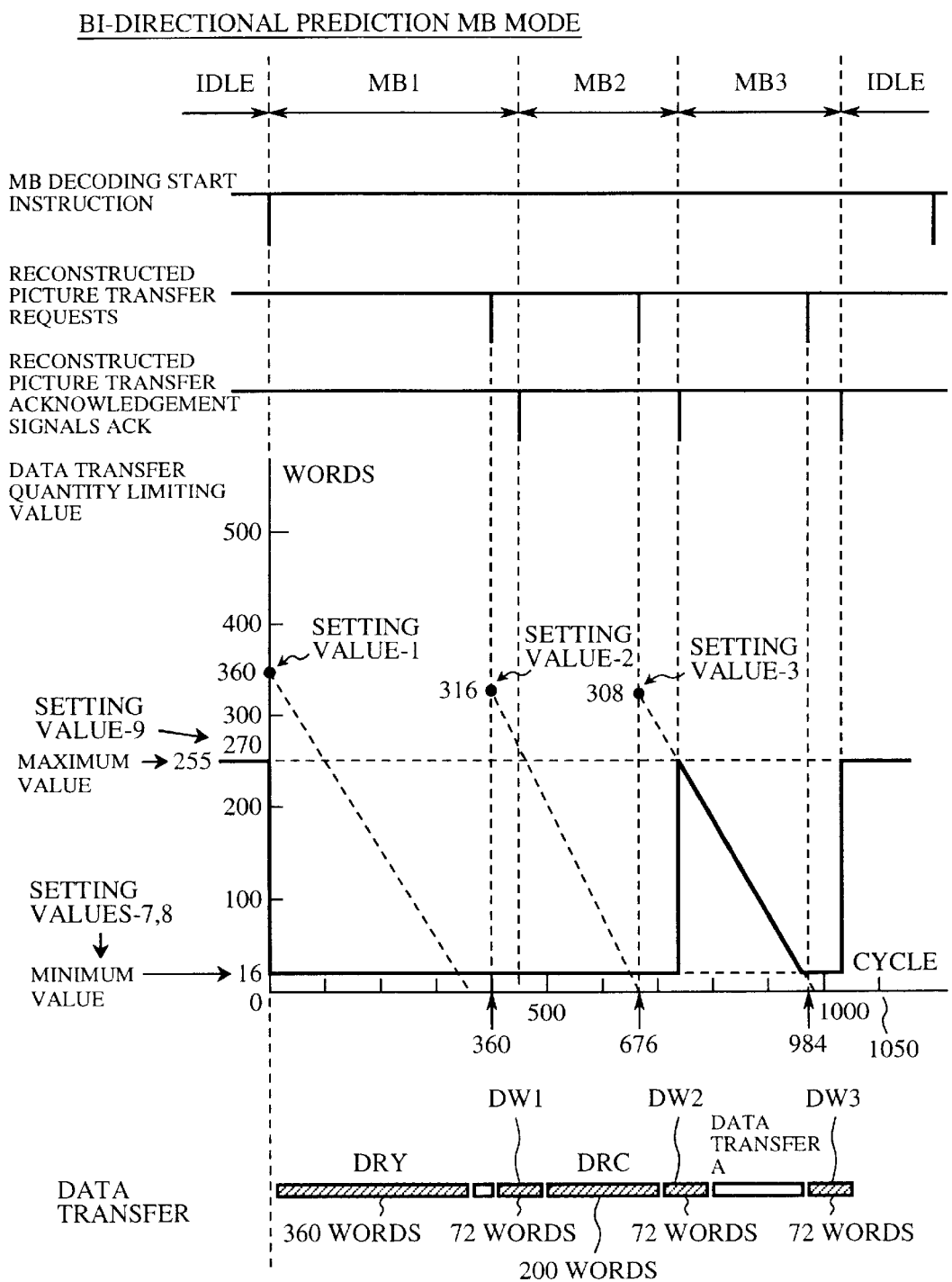
FIG. 6 is a timing chart showing a decoding operation for a macro-block (MB) performed in a bi-directional prediction MB mode according to the second embodiment of the present invention.

FIG. 5 is a timing chart showing a decoding operation for a macro-block (MB) performed in a forward prediction MB mode according to the second embodiment of the present invention, and FIG. 6 is a timing chart showing a decoding operation for a macro-block (MB) performed in a bi-directional prediction MB mode according to the second embodiment of the present invention.

An operation of the MPEG picture processing apparatus is described.

As shown in FIG. 5, in cases where the forward prediction MB mode is adopted in the MPEG picture processing apparatus, after a first predicted picture data transfer (DRY) of 180 words is performed in the MB1 state, there is a time-period of about 180 cycles until the first reconstructed picture transfer request is input to the transfer request processing unit 31. Therefore, a setting value-4 is set to 180 (words). In this case, because the setting value-4 is selected in the selector 54, even though the counted value higher than 180 is input from the counter 48 to the minimum value selecting comparator 57 in the MB1 state, the setting value-4 is selected in the minimum value selecting comparator 57. Therefore, the data transfer quantity limiting value is equal to or lower than the setting value-4 of 180 in the MB1 state, and the first predicted picture data transfer (DRY) can be started on condition that the data transfer quantity allowed for the second type data transfer is equal to or lower than the setting value-4.

Also, as shown in FIG. 5, after a second predicted picture data transfer (DRC) of 100 words is performed in the MB2 state of the forward prediction MB mode, there is a time-period of about 180 cycles until the second reconstructed picture transfer request is input to the transfer request processing unit 31. Therefore, a setting value-5 is set to 180 (words). In this case, because the setting value-5 is selected in the selector 55, even though the counted value higher than 180 is input from the counter 49 to the minimum value selecting comparator 58 in the MB2 state, the setting value-5 is selected in the minimum value selecting comparator 58. Therefore, the data transfer quantity limiting value is equal to or lower than the setting value-5 of 180 in the MB2 state, and the second predicted picture data transfer (DRC) can be started on condition that the data transfer quantity allowed for the second type data transfer is equal to or lower than the setting value-5.

Also, as shown in FIG. 5, there is no predicted picture data transfer in the MB3 state of the forward prediction MB mode. In this case, after the starting of the MB3 state, there is a time-period of about 270 cycles until the third reconstructed picture transfer request is input to the transfer request processing unit 31. In this case, a setting value-6 is set to 270 (words), and the setting value-6 is selected in the selector 56. Because the setting value-6 is higher than the maximum value, the setting value-5 is not selected in the minimum value selecting comparator 59. Therefore, the data transfer quantity limiting value is always equal to or lower than the maximum value of 255 in the MB3 state in the same manner as in the first embodiment.

Also, as shown in FIG. 6, in cases where the bi-directional prediction MB mode is adopted in the MPEG picture processing apparatus, after a first predicted picture data transfer (DRY) of 360 words is performed in the MB1 state, there is no time-period until the first reconstructed picture transfer request is input to the transfer request processing unit 31. Therefore, a setting value-7 is set to 16 (words) equal to the minimum value. In this case, because the setting value-7 is selected in the selector 54, even though the counted value higher than the minimum value is input from the counter 48 to the minimum value selecting comparator 57 in the MB1 state, the setting value-7 is always selected in the minimum value selecting comparator 57. Therefore, the data transfer quantity limiting value is equal to the minimum value in the MB1 state, and the first predicted picture data transfer (DRY) can be started on condition that the data transfer quantity allowed for the second type data transfer is equal to the minimum value.

Also, as shown in FIG. 6, after a second predicted picture data transfer (DRC) of 360 words is performed in the MB2 state of the bi-directional prediction MB mode, there is no time-period until the second reconstructed picture transfer request is input to the transfer request processing unit 31. Therefore, a setting value-8 is set to 16 (words) equal to the minimum value. In this case, because the setting value-8 is selected in the selector 55, even though the counted value higher than the minimum value is input from the counter 49 to the minimum value selecting comparator 58 in the MB2 state, the setting value-8 is always selected in the minimum value selecting comparator 58. Therefore, the data transfer quantity limiting value is equal to the minimum value in the MB2 state, and the second predicted picture data transfer (DRC) can be started on condition that the data transfer quantity allowed for the second type data transfer is equal to the minimum value.

Also, as shown in FIG. 6, there is no predicted picture data transfer in the MB3 state of the bi-directional prediction MB mode. In this case, after the starting of the MB3 state, there is a time-period of about 270 cycles until the third reconstructed picture transfer request is input to the transfer request processing unit 31. In this case, a setting value-9 is set to 270 (words), and the setting value-9 is selected in the selector 56. Because the setting value-9 is higher than the maximum value, the setting value-9 is not selected in the minimum value selecting comparator 59. Therefore, the data transfer quantity limiting value is always equal to or lower than the maximum value of 255 in the MB3 state in the same manner as in the first embodiment.

Thereafter, in the priority encoder 81 of the transfer request processing unit 31, one transfer request is selected from the predicted picture transfer request q-dr, the reconstructed picture transfer request q-dw and the data transfer requests q-a, q-b and q-c according to a pre-set priority order. In cases where a current time is within an optimum time-period of the predicted picture data transfer, the predicted picture transfer request q-dr is preferentially selected, and a transfer start instruction, which indicates the starting of the predicted picture data transfer, is output from the priority encoder 81. Therefore, the predicted picture data transfer (refer to the data transfer DRY or DRC shown in FIG. 5 or FIG. 6) from the SDRAM 14 to the local buffer 21a of the video decoder 21 is started in the macro-block decoding based on the forward prediction MB mode or the bi-directional prediction MB mode. Thereafter, a predicted picture data transfer acknowledgment signal ACK-dr is produced according to the transfer start instruction in the transfer ACK producing unit 83 and is output to the video decoding control unit 22 and the video transfer control unit 23. The outputting of the predicted picture data transfer acknowledgment signal ACK-dr is performed for each predicted picture data transfer.

Accordingly, in the second embodiment, the data transfer quantity in the second type data transfer other than the for-reconstructed-picture data transfer is limited to a value equal to or lower than one of the setting value-4 and the setting value-5 in the forward prediction MB mode, and the data transfer quantity in the second type data transfer other than the for-reconstructed-picture data transfer is limited to a value equal to or lower than one of the setting value-7 and the setting value-8 in the bi-directional prediction MB mode. Therefore, the predicted picture data transfer can be preferably performed.

Also, even though the forward prediction MB mode or the bi-directional prediction MB mode is adopted as the prediction coding mode, because the limiting degree for the data transfer quantity in the second type data transfer other than the for-reconstructed-picture data transfer can be adjusted according to the adopted prediction coding mode, the for-reconstructed-picture data transfer corresponding to the adopted prediction coding mode can be performed, and the decoding operation of the MPEG decoding processing unit 11 can be efficiently performed.

Embodiment 3

In this embodiment, in cases where a quantity of a second type of data held in a local buffer, from which the data is transferred, is larger than a prescribed value (or a threshold value of video decoding start delay), it is regarded that the quantity of the data is sufficiently large to perform the second typed at a transfer for the data, and it is regarded that it is desired to immediately transfer the second type of data to the SDRAM 14 before the for-reconstructed-picture data transfer of a next macro-block. Therefore, the transfer of the data is additionally performed during the decoding operation time-period of a current macro-block, and the starting of the decoding operation of a next macro-block is delayed. In FIG. 3, 74 indicates a comparator for comparing the possible data transfer quantity wc-a of the second type of data held in the local buffer 21a with a threshold value the-a of video decoding start delay and outputting a high-level signal in cases where the possible data transfer quantity wc-a is higher than the threshold value the-a of video decoding start delay. 75 indicates a comparator for comparing the possible data transfer quantity wc-b of the second type of data held in the local buffer 12a with a threshold value the-b of video decoding start delay and outputting a high-level signal in cases where the possible data transfer quantity wc-b is higher than the threshold value the-b of video decoding start delay. 76 indicates a comparator for comparing the possible data transfer quantity wc-c of the second type of data held in the local buffer 13a with a threshold value the-c of video decoding start delay and outputting a high-level signal in cases where the possible data transfer quantity wc-c is higher than the threshold value the-c of video decoding start delay. The threshold values the-a to the-c of video decoding start delay are changeably set. 77 indicates an OR-circuit (or a decoding start delay requesting unit) for receiving outputs of the comparators 74 to 76 and outputting a video decoding start delaying request to the video decoding control unit 22 in cases where at least one high-level signal is included in the outputs.

An operation of the MPEG picture processing apparatus is described.

As shown in FIG. 3, threshold values the-a to the-c of video decoding start delay are input to the comparators 74 to 76, and the possible data transfer quantities wc-a to wc-c of three second types of data held in the local buffers 21a, 12a and 13a are compared with the threshold values the-a to the-c. Thereafter, three compared results of the comparators 74 to 76 are input to the OR-circuit 77. In cases where at least one of the possible data transfer quantities wc-a to wc-c is higher than the corresponding threshold value of video decoding start delay, it is judged that the quantity of a particular second type of data held in the local buffer 21a, 12a or 13a is sufficiently large, and it is judged that it is desired to immediately transfer the particular second type of data to the SDRAM 14. Therefore, a video decoding start delaying request, which indicates a request for delaying the starting of the decoding operation for a next macro-block, is output from the OR-circuit 77 to the video decoding control unit 22. The outputting of the video decoding start delaying request is continued until each of the possible data transfer quantities wc-a to wc-c changeably set becomes equal to or lower than the corresponding threshold value of video decoding start delay.

Therefore, the video decoding control unit 22 controls the video decoder 21 to delay the starting of the decoding operation for a next macro-block by an MB decoding start delay time-period, and the particular second type of data is transferred to the SDRAM 14 during the MB decoding start delay time-period.

Figure 7:
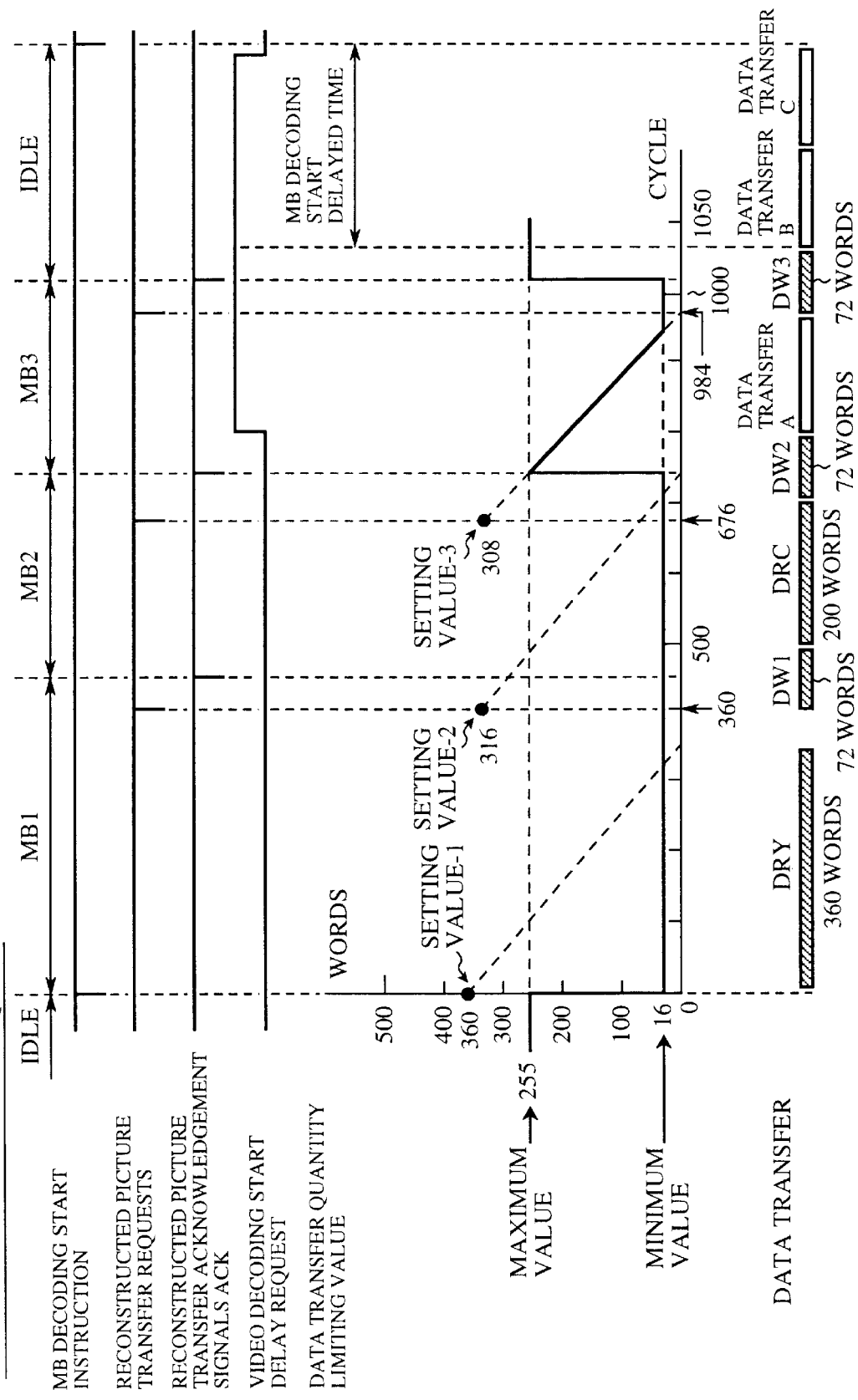
FIG. 7 is a timing chart showing a decoding operation for a macro-block (MB), in which the data transfer of two types of data is additionally performed in an IDLE state in response to a video decoding start delaying request, according to a third embodiment of the present invention.
Figure 8:
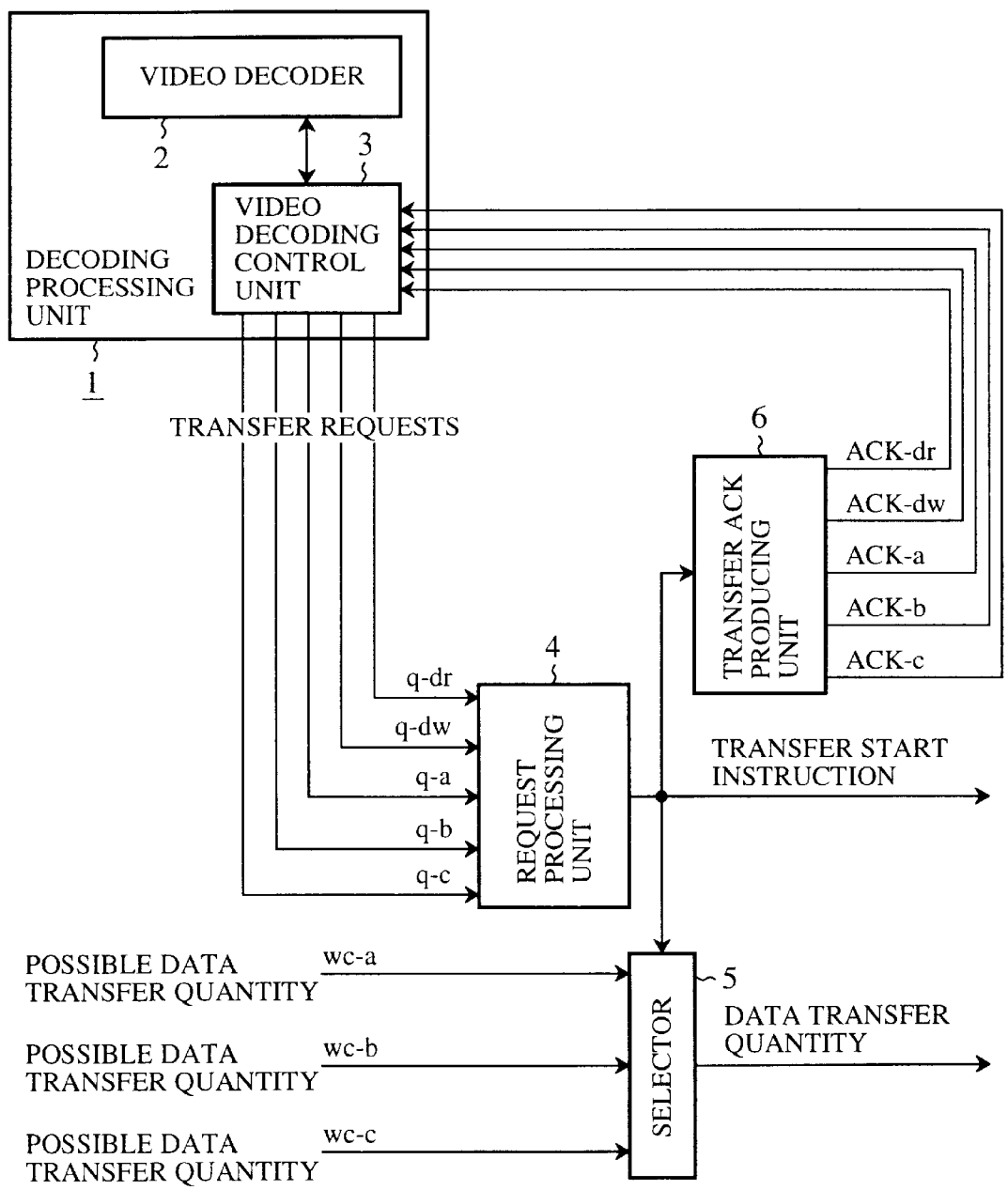
FIG. 8 is a block diagram showing the configuration of a conventional picture processing apparatus having a video decoder and a transfer request processing unit.

FIG. 7 is a timing chart showing a decoding operation for a macro-block (MB), in which the data transfer of two second types of data is additionally performed in the IDLE state in response to the video decoding start delaying request, according to the third embodiment of the present invention.

In an example of the decoding operation shown in FIG. 7, each of the possible data transfer quantities wc-b and wc-c of data held in the local buffers 12a and 13a exceeds the corresponding threshold value of video decoding start delay in the MB3 state of a current macro-block. Therefore, the reconstructed picture data transfer (DW3) is normally performed in the MB3 state of the current macro-block, the starting of the decoding operation for a next macro-block is delayed by an MB decoding start delay time-period, and the second type data transfer (that is, data transfer B) of the data held in the local buffer 12a and the second type data transfer (that is, data transfer C) of the data held in the local buffer 13a are performed during the MB decoding start delay time-period. Therefore, each of the possible data transfer quantities wc-b and wc-c becomes lower than the corresponding threshold value of video decoding start delay, no video decoding start delaying request is received in the video decoding control unit 22, and the decoding operation for the next macro-block is started.

Accordingly, in the third embodiment, in cases where the quantity of a particular second type of data held in the local buffer 21a, 12a or 13a is sufficiently large, it is judged that it is desired to immediately transfer the particular second type of data to the SDRAM 14 before the decoding of a next macro-block. Therefore, the starting of the decoding operation for the next macro-block is delayed in the MPEG decoding processing unit 11 by an MB decoding start delay time-period, and the particular second type of data can be transferred to the SDRAM 14 during the MB decoding start delay time-period in the second type data transfer other than the for-reconstructed-picture data transfer. Therefore, the second type data transfer other than the for-reconstructed-picture data transfer can be efficiently performed while the decoding operation in the MPEG decoding processing unit 11 is appropriately performed.

In this embodiment, in cases where a quantity of data held in the local buffer 21a, 12a or 13a is larger than a threshold value of video decoding start delaying, the starting of the decoding operation for a next macro-block is delayed to immediately transfer the data to the SDRAM 14 during the decoding operation of a current macro-block. However, the present invention is not limited to this case. That is, in cases where a quantity of data held in a local buffer (for example, the frame memory of the SDRAM 14), to which data held in the local buffer 21a, 12a or 13a is transferred, is lower than a prescribed value (or a threshold value of video decoding start delay), it is desired to immediately increase the data held in the SDRAM 14. Therefore, the starting of the decoding operation of a next macro-block is delayed to additionally perform the transfer of data from the local buffer 21a, 12a or 13a to the SDRAM 14 during the decoding operation time-period of the current macro-block. In this case, in cases where it is detected in a comparator that a possible data transfer quantity of data held in the SDRAM 14 is lower than a threshold value of video decoding start delay, a video decoding start delaying request is output from the comparator to the video decoding control unit 22.

What is claimed is:

1. An picture processing apparatus comprising:
   a picture data decoding processing unit for decoding picture data;
   a plurality of data processing units for respectively processing a second type of data;
   a data storing unit, which is connected with the decoding processing unit and the data processing units through a data bus, for storing the picture data and the second types of data; and
   a transfer control unit for controlling a for-reconstructed-picture data transfer between the picture data decoding processing unit and the data storing unit and a second type data transfer between each data processing unit and the data storing unit, wherein the picture data decoding processing unit comprises
   a data transfer quantity limiting value producing unit for producing a data transfer quantity limiting value set to a first setting value which is initially determined according to an optimum transfer time-period of the picture data relating to the decoding performed by the picture data decoding processing unit and is decreased with respect to an operation cycle of the decoding performed by the picture data decoding processing unit, and the transfer control unit comprises
   a transfer request processing unit for controlling a data transfer quantity of each second type of data, which is to be transferred in the second type data transfer other than the for-reconstructed-picture data transfer, according to the data transfer quantity limiting value produced in the data transfer quantity limiting value producing unit.

2. An picture processing apparatus according to claim 1, wherein the transfer request processing unit comprises
   a comparing unit for comparing a pre-set threshold value of transfer start with a possible data transfer quantity of each second type of data, the possible data transfer quantity of the second type of data being determined according to a data filled quantity of a storage area of the corresponding data processing unit or the data storing unit, from which the second type of data is transferred, and a data empty capacity of a storage area of the data storing unit or the corresponding data processing unit to which the second type of data is transferred; and
   a priority order data transfer control unit for determining a particular second type data transfer, which is first performed among the second type data transfers, according to comparison results obtained in the comparing units and a pre-set priority order.

3. An picture processing apparatus according to claim 1, wherein the data transfer quantity limiting value producing unit comprises
   a limiting unit for limiting the data transfer quantity limiting value according to a second setting value which is determined according to a macro-block decoding method adopted in the picture data decoding processing unit, the data transfer quantity limiting value limited in the limiting unit being output to the transfer request processing unit.

4. An picture processing apparatus according to claim 1, wherein the transfer request processing unit comprises
   a comparing unit for comparing a pre-set decoding delay threshold value with a possible data transfer quantity of each second type of data, the possible data transfer quantity of the second type of data being determined according to a data filled quantity of a storage area of the corresponding data processing unit or the data storing unit, from which the second type of data is transferred, and a data empty capacity of a storage area of the data storing unit or the corresponding data processing unit to which the second type of data is transferred; and
   a decoding start delay requesting unit for requesting a decoding start delay of the picture data decoding processing unit according to comparison results obtained in the comparing units to delay the starting of a decoding operation for the picture data performed in the picture data decoding processing unit.

5. A data transferring method of an picture processing apparatus, which comprises a picture data decoding processing unit for decoding picture data, a plurality of data processing units for respectively processing a second type of data, and a data storing unit, which is connected with the picture data decoding processing unit and the data processing units through a data bus, for storing the picture data and the second types of data, comprising the steps of:
   determining a first selling value according to an optimum transfer time-period of the picture data relating to the decoding performed by the picture data decoding processing unit;
   decreasing the first selling value with respect to an operation cycle of the decoding performed by the picture data decoding processing unit;
   producing a data transfer quantity limiting value set to the first setting value; and
   controlling a data transfer quantity of each second type of data, which is transferred through the data bus in a second type data transfer other than a for-reconstructed-picture data transfer of the picture data, according to the data transfer quantity limiting value.

6. A data transferring method of an picture processing apparatus according to claim 5, further comprising the steps of:
   determining a possible data transfer quantity of each second type of data according to a data filled quantity of a storage area of the corresponding data processing unit or the data storing unit, from which the second type of data is transferred, and a data empty capacity of a storage area of the data storing unit or the corresponding data processing unit to which the second type of data is transferred;

selecting one or more second type data transfers of one or more particular second types of data, of which the possible data transfer quantities are respectively larger than a threshold value of transfer start, from the second type data transfers of the second types of data;

selecting the second type data transfer of a specific second type of data relating to a highest priority from the second type data transfers of the particular second types of data: and preferentially performing the second type data transfer of the specific second type of data.

7. A data transferring method of an picture processing apparatus according to claim 5, further comprising the steps of:

determining a second setting value according to a macroblock decoding method adopted in the picture data decoding processing unit; and limiting the data transfer quantity limiting value according to the second setting value.

8. A data transferring method of an picture processing apparatus according to claim 5, further comprising the step of:

delaying the starting of the decoding of a next macroblock to be performed in the picture data decoding processing unit, in cases where one second type data transfer other than the for-reconstructed-picture data transfer remains when the decoding of a current macroblock performed in the picture data decoding processing unit is completed, until the second type data transfer other than the for-reconstructed-picture data transfer is completed.

* * * * *